United States Patent
Shono

[11] Patent Number: 6,164,881
[45] Date of Patent: *Dec. 26, 2000

[54] MACHINE TOOL

[75] Inventor: Yoshitaka Shono, Utsunomiya, Japan

[73] Assignee: Toko, Inc., Funabashi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/029,427

[22] PCT Filed: Jul. 18, 1997

[86] PCT No.: PCT/JP97/02496

§ 371 Date: Mar. 3, 1998

§ 102(e) Date: Mar. 3, 1998

[87] PCT Pub. No.: WO98/03302

PCT Pub. Date: Jan. 29, 1998

[30] Foreign Application Priority Data

Jul. 23, 1996 [JP] Japan .................. 8-193769
Sep. 9, 1996 [JP] Japan .................. 8-238240

[51] Int. Cl.[7] ............... B23C 9/00; B23Q 11/08; B23Q 11/10

[52] U.S. Cl. ............... 409/137; 83/100; 408/56; 408/61; 408/67; 409/135; 409/136

[58] Field of Search .............. 83/100; 409/137, 409/136, 134, 135; 408/67, 56, 61; 451/451, 452, 453, 454, 455, 456, 457

[56] References Cited

U.S. PATENT DOCUMENTS

| | | | |
|---|---|---|---|
| 3,824,890 | 7/1974 | Zettler et al. | 409/134 |
| 3,837,383 | 9/1974 | Ko | 408/67 |
| 4,011,792 | 3/1977 | Davis | 83/100 |
| 4,192,104 | 3/1980 | Patenaude | 83/100 |
| 4,778,315 | 10/1988 | Duffy et al. | 409/136 |
| 4,921,375 | 5/1990 | Famulari | 408/67 |
| 5,332,343 | 7/1994 | Watanabe et al. | 409/136 |
| 5,356,245 | 10/1994 | Hosoi et al. | 408/56 |
| 5,474,116 | 12/1995 | Shoda | 409/137 |
| 5,645,382 | 7/1997 | Homanick et al. | 409/137 |
| 5,653,561 | 8/1997 | May | 408/67 |
| 5,688,082 | 11/1997 | Richardson | 409/137 |
| 5,779,402 | 7/1998 | Kameda | 409/136 |
| 5,791,842 | 8/1998 | Sugata | 409/137 |

FOREIGN PATENT DOCUMENTS

| | | |
|---|---|---|
| 53-25274 | 6/1978 | Japan . |
| 54-132890 | 5/1981 | Japan . |
| 58-59746 | 4/1983 | Japan . |
| 58-19238 | 8/1984 | Japan . |
| 60-191740 | 9/1985 | Japan . |
| 62-106708 | 7/1987 | Japan . |
| 5 4146 | 1/1993 | Japan . |
| 5-9205 | 2/1993 | Japan . |
| 6-37878 | 10/1994 | Japan . |
| 7 55437 | 6/1995 | Japan . |
| 7-246540 | 9/1995 | Japan . |
| 7 276184 | 10/1995 | Japan . |
| 8-71884 | 3/1996 | Japan . |
| 8-71885 | 3/1996 | Japan . |

Primary Examiner—M. Rachuba
Assistant Examiner—Sean Pryor
Attorney, Agent, or Firm—Pearne & Gordon LLP

[57] ABSTRACT

In order to process a solid processed object with a simple construction, and to process a solid and flat work while effectively collecting particulate scraps, in a machine tool for processing work in which a working table on which the work is mounted and a spindle in which a cutter is installed move relatively to each other, a bellow which telescopes freely is provided, one open end of which connects to the spindle head so as to surround the spindle, and the other open end of which connects to a working table in such a manner as to surround the work.

18 Claims, 12 Drawing Sheets

MACHINE TOOL

FIELD OF INDUSTRIAL APPLICATION

The present invention relates to a machine tool which processes a work while collecting particulate scraps produced especially during processing.

BACKGROUND TECHNOLOGY

In Japan, in the published Japanese Patent Application, First Publication No. Hei 6-55402 (Japanese Patent Application, Second Publication No. Hei 7-55437), a technology related to a cutter cooler and a particulate scrap collector in a processing machine is disclosed. In this conventional technology, by using a flexible hood, a cooling-collecting housing covering a cutter is brought into tight contact with the work, forming a closed space, and the particulate scraps produced by the processing are sucked up and collected by a vacuum particle suction apparatus connected to the cooling-collecting housing. Then, after blowing the cool air on the cutter, once the particulate scraps are blown upward off the cutter, they are and gathered in an exhaust duct.

In addition, similarly in Japanese Patent Publication, First Publication H 6-71539, a table which moves the work in the x-y direction, a vertically moving cutter, and a collection mechanism which collects particulate scraps produced by the cutting of said cutter is described. This collecting mechanism is brought close to said movable duct in the horizontal direction of the cutter, blows air on the section of the work being cut from a nozzle built into said movable duct, and recovers the particulate scraps by a relay duct connected to said movable duct. This relay duct, following the movement of the cutter when it is moving vertically, is enclosed in the recovery duct. When the cutter is replaced, it is raised while the movable duct is retracted, and the cutter is replaced using the tool replacement apparatus.

However, the technology described in the above mentioned Japanese Patent Application, First Publication No. Hei 6-55402 processes the work by moving the cutter inside a stationary cooling-collecting housing formed by the upper mounting member, the middle mounting member, the lower mounting member, and the hood mounting member, but the vertical movement stroke of the cutter is limited, for example, by the height dimensions of the cooling-collecting housing. Therefore, even if the vertical movement stroke of the cutter is small, while it is possible to collect effectively the particulate scraps from flat work which can be processed, for a large solid work of relatively great height, it is difficult to achieve efficient collection of particulate scraps. Also, the direction of the blowing of the cooling air towards the cutter is stationary, and it is not a changeable structure such that cooled air is blown on the cutter in the most suitable conditions.

In contrast, in the conventional technology described in Japanese Patent Application, First Publication Hei 6-71539, the whole cutter is not covered by the ducts, etc., and because between the cutter and the work a gap is created while processing, particulate scraps are easily carried to these gaps. Also, during the cutting process in the horizontal direction, when cutting in one direction particulate scrap collection can be effectively performed, while when processing in the in the opposite direction during processing, the collection of particulate scraps is difficult. For example, when cutting proceeds at a certain height in the right direction, then cutting after changing the direction 90°, and finally cutting in the opposite direction, when cutting in each of the opposite directions, because the particulate scraps scatter in the direction opposite of the movable duct, the particulate scraps cannot be effectively collected. As a result, it is frequently necessary to clean the inside of the apparatus.

DISCLOSURE OF THE INVENTION

The present invention is intended to resolve the above-described technical problems, and has the following as its goals:

a. To present a machine tool which can process a solid work having height with a simple structure.

b. To present a machine tool which can process the above-mentioned solid work and plate work while effectively gathering particulate scraps.

c. To present a machine tool which can prevent scattering of particulate scraps with a simple structure.

In order to achieve these goals, in the present invention employs a technological means furnished with a freely telescoping separating means in which one open end is connected to a spindle head that encloses a spindle and the other open end is connected to a working table which introduces the work, in a machine tool in which a working table on which the work is mounted and a spindle in which the cutter is installed move relatively to each other processing the work.

By employing such a technical means, because the cutter installed in the spindle can be moved over a comparatively large area of the work, not only flat work, but large solid work of a comparatively thick dimension can be easily processed.

In addition, the present invention employs a technical means provided, with an enclosing means which encloses the work, built on the working table with one surface open, a cutter for processing the work, a moving means for moving the cutter and the upper enclosing means, installed with said cutter and disposed over said enclosing means, a connection means inserted between said cutter and the moving means, and telescopes following the movement of the cutter, a covering means disposed between said enclosing means and moving means, covering the upper open end of the enclosing means, and telescopes according to the movement of the moving means.

By employing such technical means, in addition to being able to move the cutter covered within the enclosing means in a comparatively large stroke, the scattering of particulate scraps produced during the processing can be reduced. Therefore, in comparison to the conventional technology, using an extremely simple construction, flat work as well as solid work can be easily processed without particulate scraps scattering outside of the enclosing means.

THE PREFERRED EMBODIMENTS OF THE PRESENT INVENTION

Below, the preferred embodiments of the machine tool of the present invention will be explained referring to the above figures.

A. The First Embodiment

Figure 1:
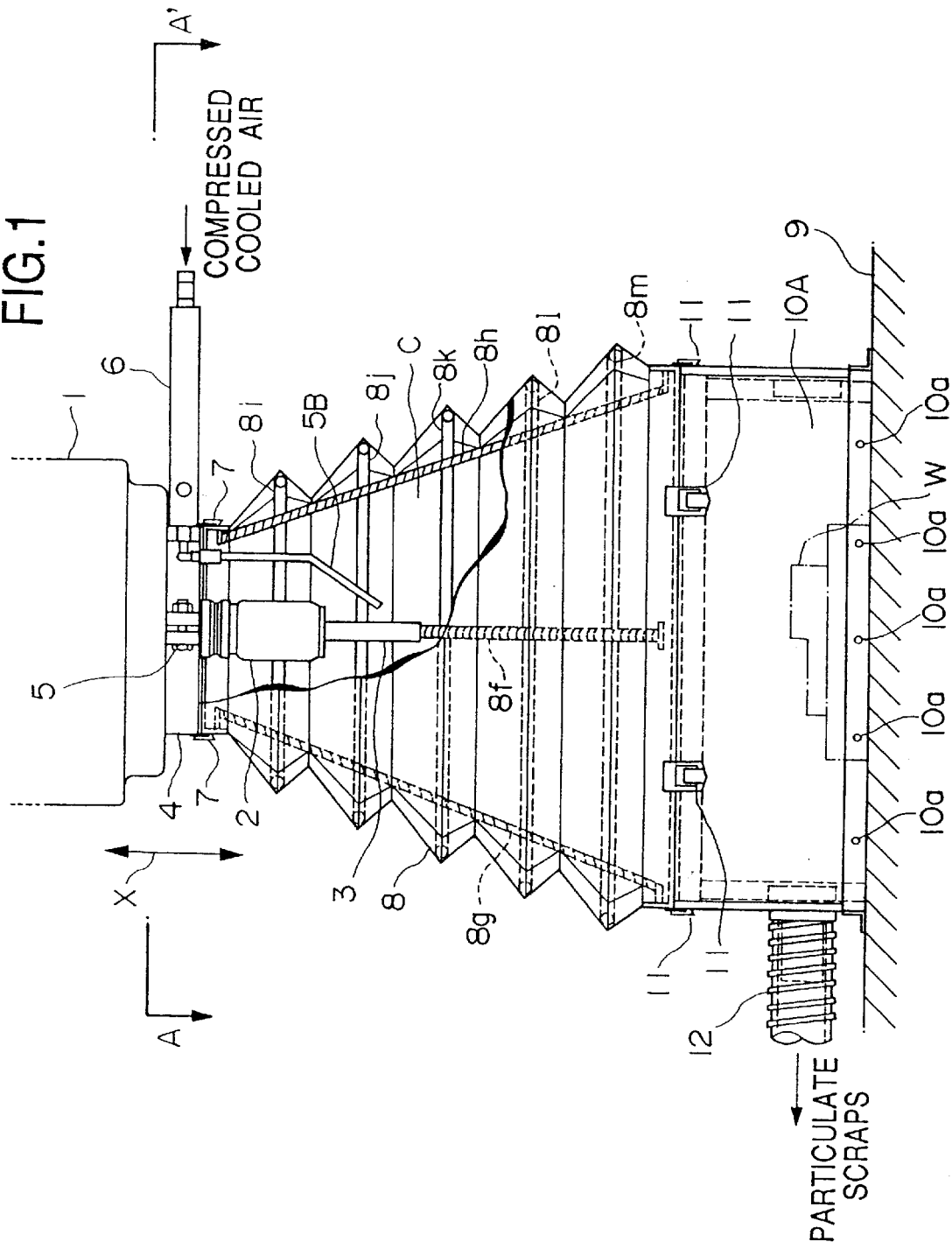
FIG. 1 is a front elevation showing the construction of the first embodiment of the machine tool of the present invention.
Figure 2:
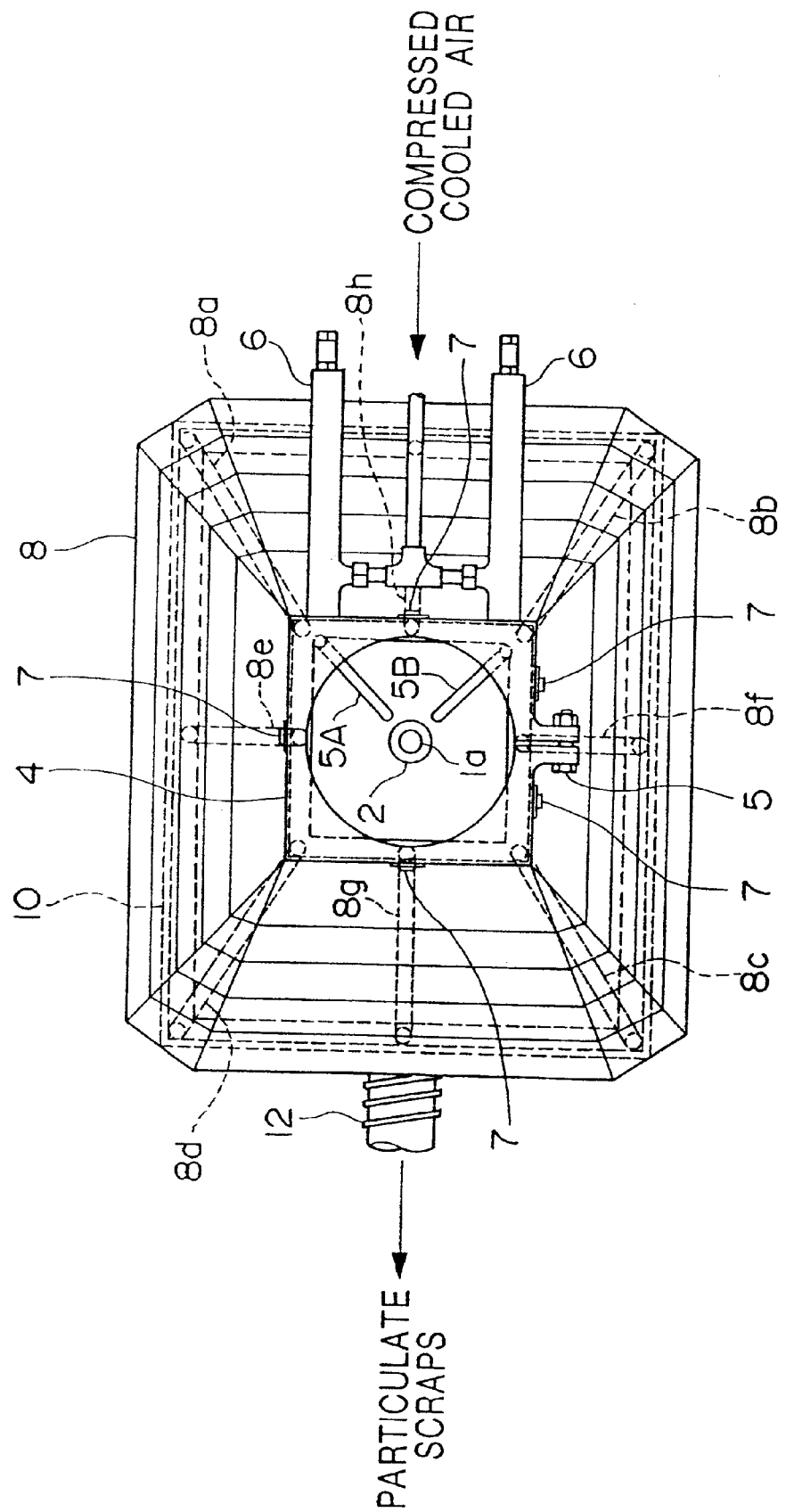
FIG. 2 is a view along line A—A' shown in FIG. 1.

First, the construction of the first embodiment of the present invention is explained in referring to FIGS. 1 and 2.

In these figures, numeral 1 is the spindle head, supported so as to be freely moving in the vertical direction, that is, the direction of the x arrow, and in the end part of the spindle 1a enclosed within it, cutter 3 is quick-release installed by holder 2. Also, at the lower part of spindle head 1, bracket 4 is held in place by screw 5, and at said bracket 4 two air nozzles 5A and 5B projecting towards cutter 3 are provided.

Said air nozzles 5A and 5B are disposed so as to blow compressed cooled air on cutter 3 from different directions, and can be freely bent so as to adjust the direction and height of blowing. In these air nozzles 5A and 5B, air coolers 6 connected to said air nozzles 5A and 5B are provided, and each air cooler 6 is provided with external compressed air.

At the lower part of the above-mentioned bracket 4, a bellow 8, which is a separation member, is quick-release attached by means of the upper connecting member 7. As shown in FIG. 2, said upper connecting member 7 is provided in several places on the outer perimeter of bracket 4, connecting the bracket 4 and the bellow 8 in a closed condition.

The bellow 8 vertical cross section is square, and in the direction of its expansion and contraction, that is, in the direction of the arrow X, the corner part of said square is beveled in a straight line forming a pouch, and made with an elastic material. The beveling can be in an arc as well as in a straight line. In addition, the cross section of the bellow 8 can be circular as well as square, and further, a bellow need not be used.

In addition, in order to prevent the inner collapse of the flexible bellow 8 from negative pressure when the spindle 1 is lowered and the bellows fold up, a plurality of elastic coil springs 8a–8h and rigid rings 8i–8m are provided. These coil springs 8a–8h and rings 8i–8m form the prevention means.

There are a total of 8 coil springs 8a–8h, as shown in FIG. 2, fastening the four corners of the bellow 8 and the middle of each edge with the upper open end and the lower open end. The rings 8i–8m are sized corresponding to the inner circumference of each convex part (convex seen from within the bellow 8) of the bellow 8 spreading down, and the inner surface of each convex part telescopes when pressure is applied.

For example, when the bellow 8 is formed from an elastic material such as rubber, by forming rings 8i–8m slightly larger than the inner circumference of each convex part, by the bellow 8 expanding towards the outer circumference, each ring 8i–8m without fail fastens to the inner surface of the bellow 8, and the convex part is anchored.

In addition, between the bellow 8 and the working table 9 a cylindrical lower case 10A (relay part) is interposed. The lower end of the lower case 10A is anchored to the working table 9, and the upper end is quick-release connected to the other open end of the bellow 8 by the lower connecting member 11. That is, a partially enclosed inner space C is formed by the bellow 8, the working table 9, and the lower case 10A. On the working table 9 in this inner space C, the flat or solid work W is mounted. For example, the work W may be aluminum or carbon which produces small particulate scraps.

On the lower surface of the lower case 10A a plurality of holes 10a are formed as a ventilation means for bringing external air into the inner space C, and the collecting duct 12 which connects the external collecting apparatus not shown in the figure and the inner part of the lower case 10A is connected. Moreover, a gap formed by making a gap between the working table 9 and the lower case 10A can be used instead of the plurality of holes 10a as the ventilation means.

The above-mentioned case 10A is formed from a transparent material, such as acrylic plate, and the condition inside can be confirmed from the outside. The working table 9 is formed so as to move within a defined range within the horizontal surface by a drive such as a servo-motor, and the work W mounted on the upper surface can be moved with the horizontal surface.

With this type of construction, work W is disposed within the inner space C formed by the bellow 8, the working table 9 and the lower case 10A, and processed with the cutter 3. That is, when work W is processed, first spindle 1a is lowered coming into closed contact with work W, the working table 9 is moved according to the predetermined processing information, and each part of work W is processed.

In this case, because the spindle 1a and the lower case 10A are connected by the flexible bellow 8, and because the cutter 3 can be freely moved vertically in a comparatively large stroke, whether the dimension in the direction of the arrow X is of a comparatively large solid work W or the dimension of the direction of the arrow X is of a comparatively small flat work W, cutter 3 can be freely moved and processing can be carried out according to the part of the work W to be processed.

During the processing by the above described cutter 3, cooled compressed air is blown onto the cutter 3 from nozzles 5A and 5B. In this way the cutter 3 which is heated by the processing can be effectively cooled, and the particulate scraps produced around said cutter 3 are blown away by the compressed air.

Also, during processing, the air inside the inner space C is sucked out through the collecting duct 12 by activating the collecting apparatus. Therefore, the small particulate scraps of carbon etc., blown out by the compressed cool air do not scatter outside the inner space C, nor do they penetrate into the inside of the driving mechanism of the spindle 1a, and are expelled in concentration from the collecting duct 12 with the air drawn in from the outside via the holes 10a.

At this time, inside the inner space C there is a negative pressure with respect to the external environment, and although the flexible bellow 8 is subject to an external force that would make it collapse into the inner space C, collapse is prevented by the prevention means made from the plurality of coil springs 8a–8h and the rings 8i–8m.

In addition, because the upper open end of the bellow 8 is quick-release connected to bracket 4 by the upper connecting member 7, and the lower open is similarly connected to the lower case 10A by the lower connecting member 11, the connection between the upper open end of bellow 8 and bracket 4 can be released facilitating the replacement of the cutter 3, and by releasing the connection between the lower open end of bellow 8 and the lower case 10A, work W can be easily mounted inside the inner space C.

B. The Second Embodiment

Figure 3:
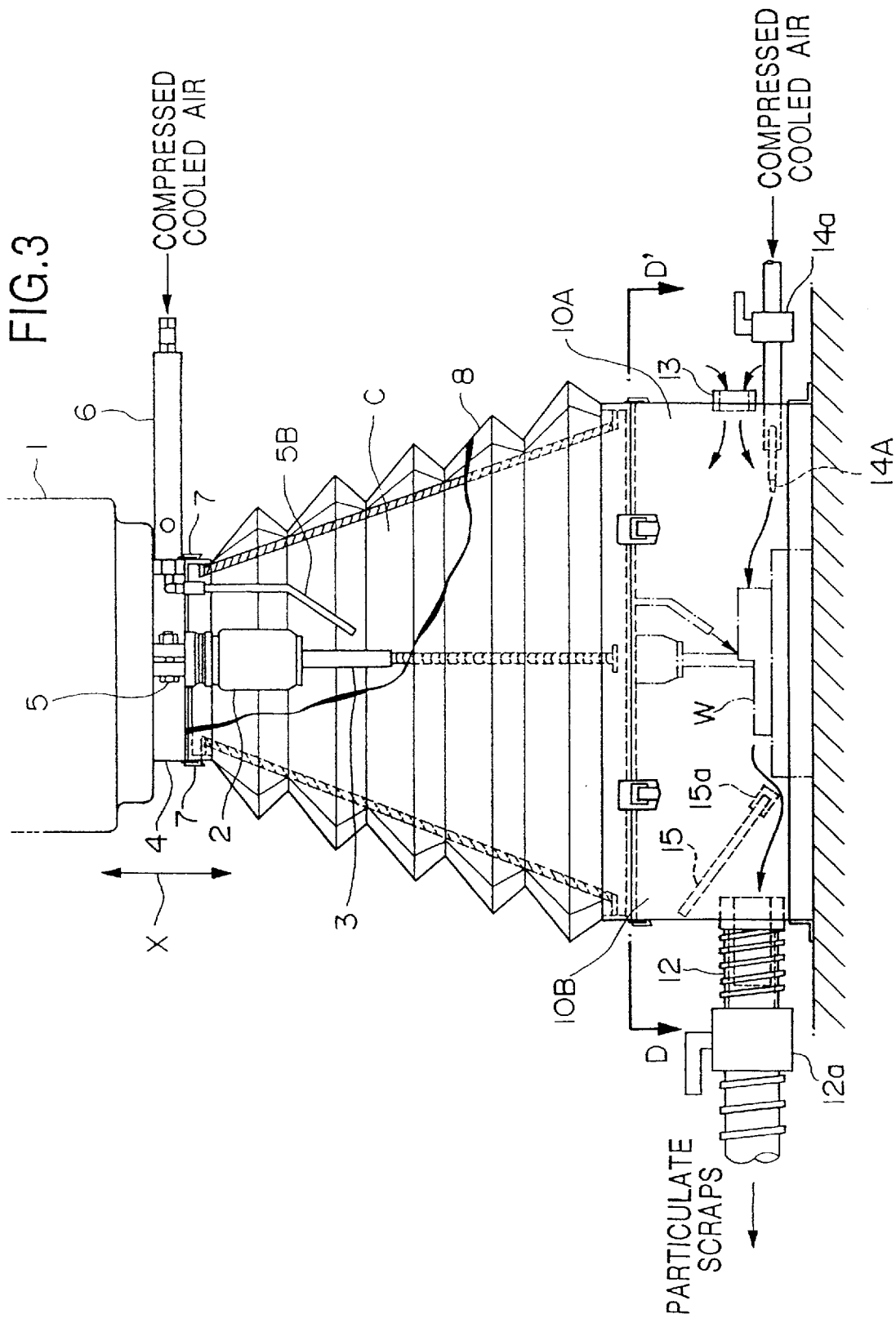
FIG. 3 is a front elevation showing the construction of the second embodiment of the machine tool of the present invention.
Figure 4:
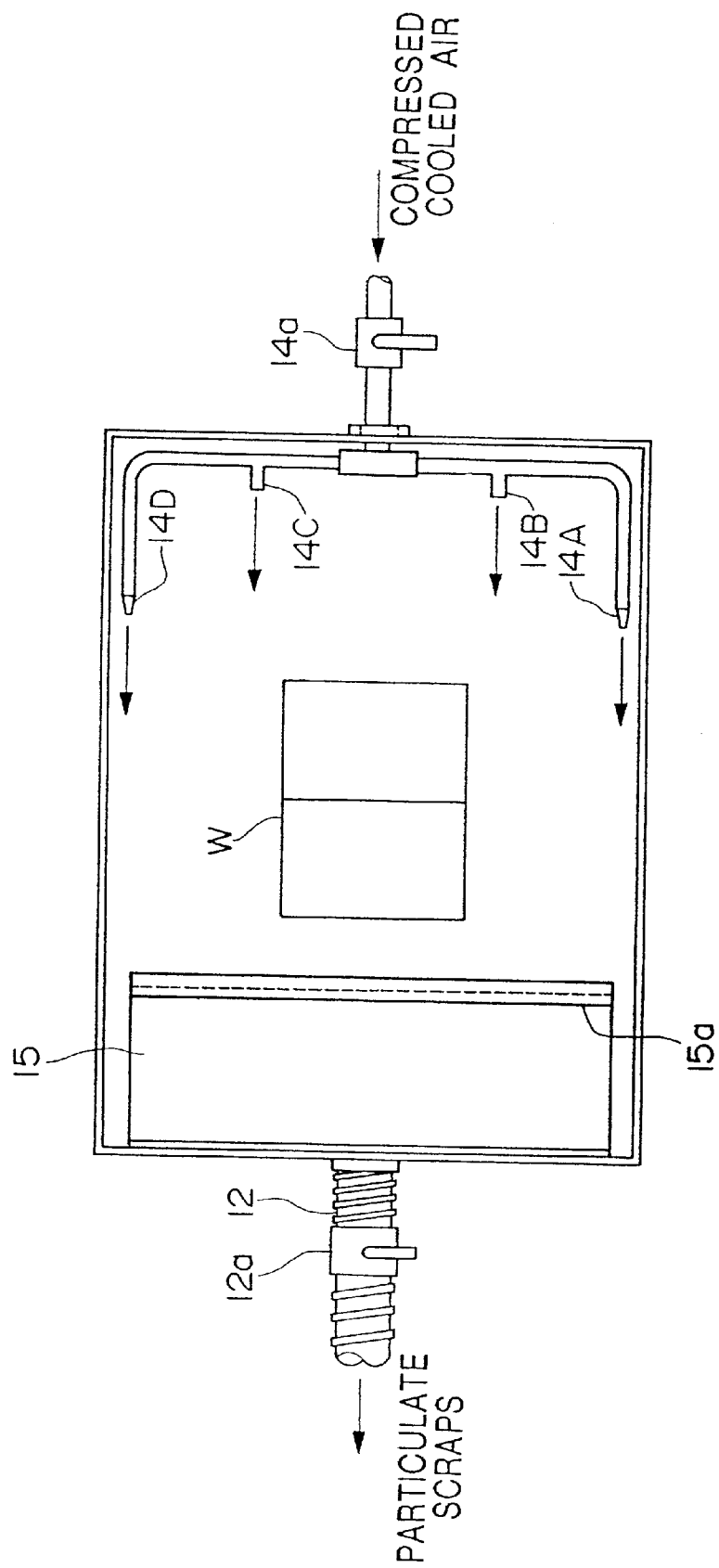
FIG. 4 is a view along line D—D' shown in FIG. 3.

Next, the construction of the second embodiment of the present invention will be explained with reference to FIG. 3 and FIG. 4. Moreover, concerning the elements of the construction already explained in the above-described first embodiment, the same numerals will be used and the explanation omitted.

In these figures, numeral 13 is the external air intake opening, and is built facing the collecting duct 12 of the lower case 10B formed in the same manner as the above-mentioned lower case 10A. And in the inner space C, external air is brought in by said external air intake opening 13.

14A–14D are the compressed air nozzles, and are built opposite the collection duct 12 of the lower case 10B in the same manner as the external air intake opening 13, and the amount of the flow of the compressed air blown on the area of the work W can be adjusted by the airflow regulator valve 14a. Also, in this case, the air (including the particulate scraps) inside the inner space C flowing from collecting duct 12 is adjusted by the airflow regulator valve 14a, and sucked into the collection apparatus.

Numeral 15 is a rectangular guide plate, and it is disposed on a diagonal towards work W from the wall surface of lower case 10B so as to obstruct the front of the collection duct 12 and the external air intake opening 13 between the above-described collection duct 12 in lower case 10B and the work W. At the end surface of said guide plate 15 on the side of the work W, a sliding plate 15a (airflow regulator means) which can slide independently of guide plate 15 is constructed.

The machine tool according to this embodiment, compressed cooled air is blown on cutter 3 from air nozzles 5A and 5B, external air is taken into the inner space C from the external air intake opening 13, and compressed air is blown into the area of work W by the compressed air nozzles 14A–14D. At this time, the particulate scraps in the area of the cutter 3 are scattered to the perimeter by the compressed cooled air from air nozzles 5A and 5B, said scattered particulate scraps are gathered in the direction of the collection duct 12 by the compressed air from compressed air nozzles 14A–14D, and recovered within said collection duct 12 by the suction force of the collection duct 12.

In addition, by the action of guide plate 15, the air from the external air intake opening 13 and the compressed air from compressed air nozzles 14A–14D is accelerated by the narrowing of the flow path. Thus, the particulate scraps around the perimeter of cutter 3 are effectively blown towards the collection duct 12 and are effectively recovered in collection duct 12. Furthermore, by sliding said sliding plate 15a towards guide plate 15, the width of the flow path of the compressed air is adjusted and the suction power on the particulate scraps is regulated.

C. The Third Embodiment

Figure 5:
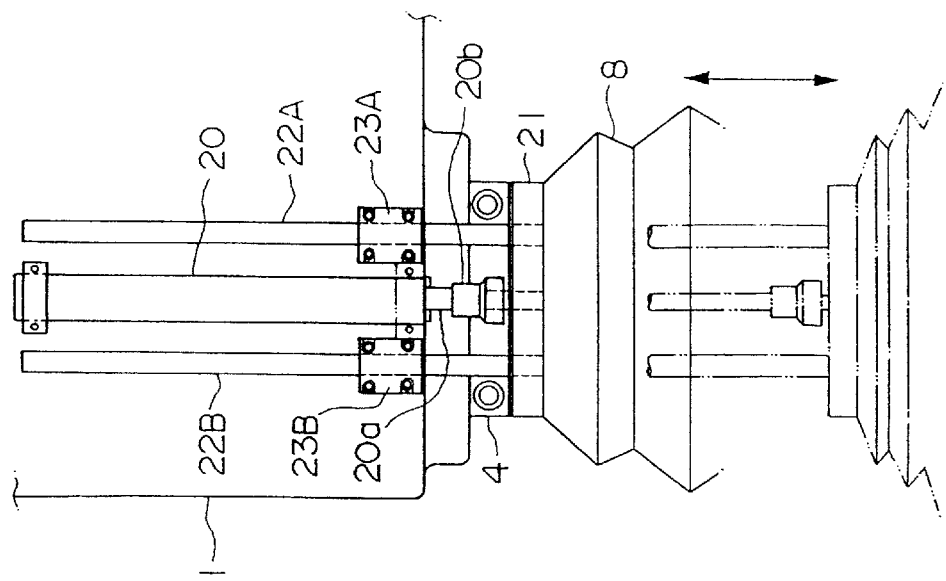
FIG. 5 is a front elevation showing the construction of the third embodiment of the machine tool of the present invention.

Next, the third embodiment of the machine tool of the present invention will be explained referring to FIG. 5. Moreover, this embodiment adds a device to the above-mentioned installation means, and the explanation of the elements of the construction already explained will be omitted.

In the above-mentioned embodiment, while bellow 8 and spindle head 1 are quick-release attached by the upper connecting member 7, in this embodiment an installation means which automatically performs said quick-release is constructed.

That is, numeral 20 is an air cylinder (drive means), and movable rod 20a is fixed to the spindle head 1 in such a way as to move vertically in a perpendicular direction. The end of the movable rod 20a is fixed to the upper mounting metal fixture 21 which is fastened to the upper end of the bellow 8 by the floating joint 20b. 22A and 22B are guide bars disposed on both sides of the air cylinder 20, and fixed to the spindle head 1 by bowl bushing 23A and 23B to allow free vertical movement. Also, the end of guide bars 22A and 22B on the side of the bellow 8 are fixed to the upper mounting metal fixture 21.

Figure 6:
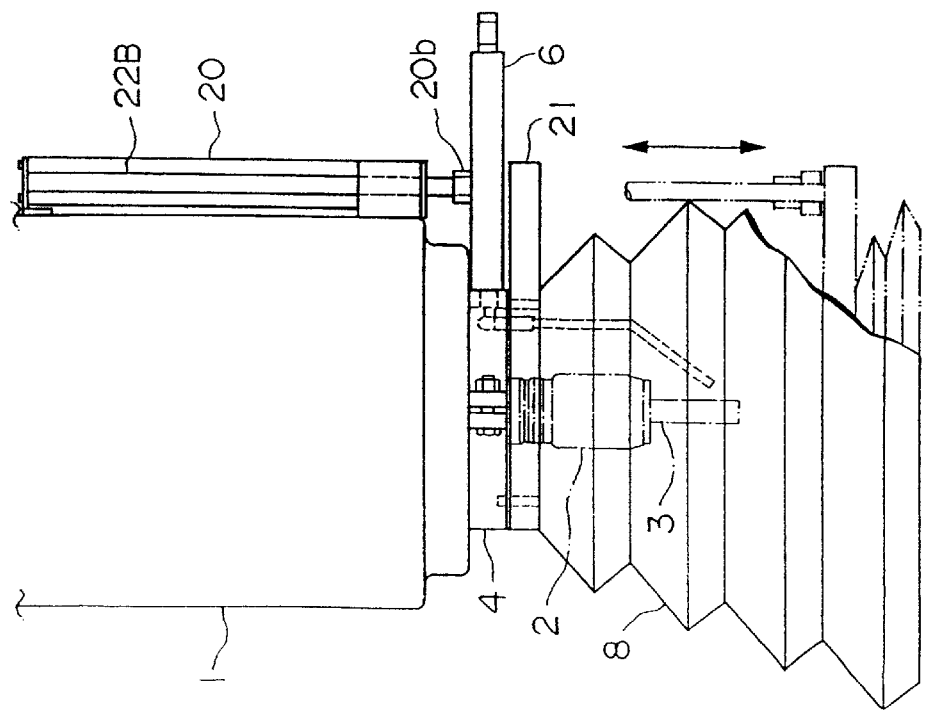
FIG. 6 is a side view showing the construction of the third embodiment of the machine tool of the present invention.
Figure 7:
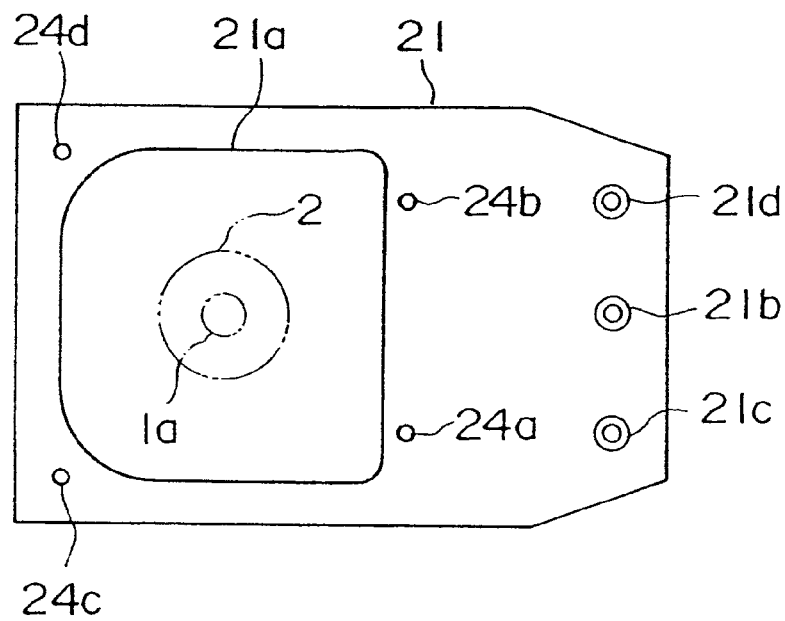
FIG. 7 is a front elevation showing the construction of the upper mounting metal fittings in the third embodiment of the machine tool of the present invention.
Figure 8:
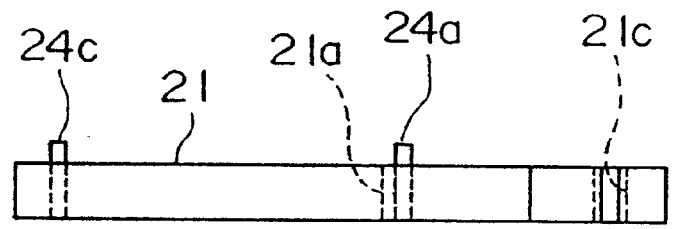
FIG. 8 is a side view showing the construction of the upper mounting metal fittings in the third embodiment of the machine tool of the present invention.

The above-mentioned upper mounting metal fixture 21, as shown in FIG. 6, is formed by the insertion opening 21a into which spindle 1a is inserted, screw hole 21b to which one end of the above-mentioned floating joint 20b is attached, screw holes 21c and 21d into which the end of guide bars 22A and 22B are inserted, and the associated pins 24a–24d which engage bracket 4 and are disposed on the perimeter of the above-mentioned insertion opening 21a.

In the machine tool of the present embodiment, the upper part of the bellow 8 is connected to the spindle head 1 by guide bars 22A and 22B and the air cylinder 20 by the upper mounting metal fixture 21. At this time, the above-mentioned associated pins 24a–24d are engaged in the bracket 4, and the upper mounting metal fixture 21 is positioned with respect to the spindle head 1.

In addition, when the air cylinder 20 is moved and the movable rod 20a is brought down, guide bars 22A and 22B slide via the bowl bushing 23A and 23B, the upper mounting metal fixture 21 is pushed down, and the bellow 8 becomes separated from the spindle head 1. At this time, because the floating joint 20b is interposed between the air cylinder 20 and the upper mounting metal fixture 21, adjustment of the assembly is accurately performed, and so though a stroke of a certain length, the upper mounting metal fitting can be pushed down without hindrance.

In this situation, cutter 3 attached to the end of spindle 1a is protruding. That is, because cutter 3 automatically protrudes by the movement of the air cylinder 20, the work of replacing the cutter 3 can be carried out with great facility.

Each of the above-described embodiments of the machine tool effects the following:

a. Because the cutter 3 attached to the spindle 1a can be moved comparatively widely with respect to the work W, not only flat work W, but large work W of a comparatively high height dimension can be easily processed.

b. Because the bellow 8 is used as the separation member, one of whose open ends is connected to the spindle 1a in such a way as to cover the spindle 1a, while the other open end is connected to the working table 9 in such a way as to enclose the work W, the cutter 3 can be moved without scattering particulate scraps produced by the processing outside.

c. In comparison with the conventional apparatus, because the structure is simple, the cost of the machine tool can be lowered.

d. Because one or both of the open ends of the bellow 8 used as a separation member are quick-release attached to the upper connecting member 7 and the lower connecting member 11 which are the installation means, by opening the upper connecting member 7 or the lower connecting member 11 and separating the bellow 8 and the spindle 1a or the bellow 8 and the lower case 10A, it is easy to replace the cutter 3 or mount the work W on the working table 9.

e. Because one of the open ends of the bellow 8 is quick-release attached to the spindle head 1 by the air cylinder 20 which is the driving means, when the air cylinder 20 is activated, the bellow 8 becomes automatically separated from the spindle head 1. Thus, the replacement of the cutter 3 installed in the spindle 1a is considerably facilitated.

f. Because the lower case 10A, which is provided with a collecting duct 12 to suck in the particulate scraps and the holes 10a for taking in external air, is inserted between the other open end of the bellow 8 and the working table 9, the air which flows in from the outside through the holes 10a is efficiently sucked into the collecting duct 12 along with the particulate scraps.

g. Because the air nozzles 5A and 5B are formed such that they can be bent, it is easy to adjust the direction of blowing of the compressed cooled air from said air nozzles 5A and 5B on the cutter 3. Therefore, depending on such factors as the kind of cutter 3 and the shape of work W, cutter 3 can be cooled and the particulate scraps efficiently scattered to the perimeter of the cutter 3.

h. Because the coil springs 8a–8h (the prevention means) which prevent buckling of the bellow 8 towards the work W are situated along both surfaces of the bellow 8 so as to enclose work W, and are constructed so as to connect one open end with the other open end, it is possible to prevent the bellow 8 from falling on work W due to buckling of the bellow 8 and the bellow 8 coming into contact with the cutter 3.

i. At the lower case 10B, because the work is inserted and the external air intake opening 13 is disposed positioned towards the collecting duct 12, the particulate scraps can be effectively moved to the collecting duct 12 by the external air introduced in the direction of the collection duct 12.

j. At the lower case 10B, because the compressed air nozzles 14A–14D which blow particulate scraps towards the collecting duct 12 are provided, the particulate scraps in the area of the work W can be effectively moved to the collecting duct 12 by the compressed air injected from said compressed air nozzles 14A–14D.

k. In the lower case 10B, because the guide plate 15 which narrowly restricts the flow of air sucked into the collecting duct 12 is disposed between the collecting duct 12 and the work W, the flow velocity between the collecting duct 12 and the work W is increased, increasing the suction power of the collecting duct 12, effectively collecting the particulate scraps.

l. At guide plate 15, because a sliding plate 15a which adjusts the width the flow path of the air, the suction power can be optimally set.

m. Because the lower cases 10A and 10B are made transparent, the condition of the processing of work W can be easily confirmed.

Moreover, the present embodiment is not limited to the above-described forms, and the following embodiments are included in the range of the present invention:

a. Each of the above-described embodiments is constructed in such a way that the work W is processed by the cutter 3 being moved by vertical movement of the spindle head 1 while the work W being moved over the horizontal surface of the working table 9, but the present invention is not limited to this. A type of machine that processes the work W by relatively moving the cutter 3 with respect to the work W is included the range of the present invention. For example, a type of machine which moves the spindle head 1 in three dimensions while the working table 9 is anchored is included in the range of the present invention.

b. In the above-described embodiments, a flexible bellow 8 is used as a separation member, but an elastic material such as rubber can be used as well. Also, as the flexible separation member, an airtight or permeable curtain can also be used. When a permeable curtain is used, because external air is brought into the internal space by said curtain, it is possible to omit the holes 10a and the external air intake opening 13 built into the lower cases 10A and 10B.

c. The above-described embodiments are constructed with a plurality of coil springs 8a–8h being disposed inside the bellow 8, but a plurality of spring coils pulling outward can also be disposed outside the bellow, and in place of coil springs 8a–8h elastic material such as rubber straps can also be used.

d. By disposing one large aperture coil spring spiral stretching in a spiral along the inner surface of the bellow 8 from the lower open end to the upper open end of the bellow 8, the bellow 8 can be supported without disposing a plurality of coil springs 8a–8h. Also, in place of coil springs 8a–8h, an elastic material such as a glass fiber rod can be used.

e. In consideration of weather-resistance towards cutting oil and heat-resistance towards the heat generated by cutting, a resin sheet can be attached to the inside of an elastic material such as rubber in the bellow 8.

f. In the above-described embodiments, the cutter 3 is disposed in such a way as to be blown on by air from two directions, but in addition a plurality of air nozzles blowing from many directions can be built.

g. In the above-described first embodiment, a guide plate 15 described in the second embodiment can be constructed.

h. In the above-described third embodiment, an installation means is provided on only one side of the spindle head 1, but a pair of said installation means can be built that the spindle head 1 can be inserted into. In this case, the weight of the bellow 8 is divided between two installation means, and the durability of said installation means is increased.

D. The Fourth Embodiment

The fourth embodiment of the present invention will be explained with reference to FIGS. 9 to 15.

In these figures, numeral 51 is a case (enclosing means) formed in a square tube, built onto or anchored onto the working table with the upper surface open. This working table is constructed so as to move in two dimensions in the X-Y plane, that is over the horizontal surface, by a driving apparatus not shown in the figures, and the work W disposed within said case 51 can be moved over the X-Y plane.

Figure 10:
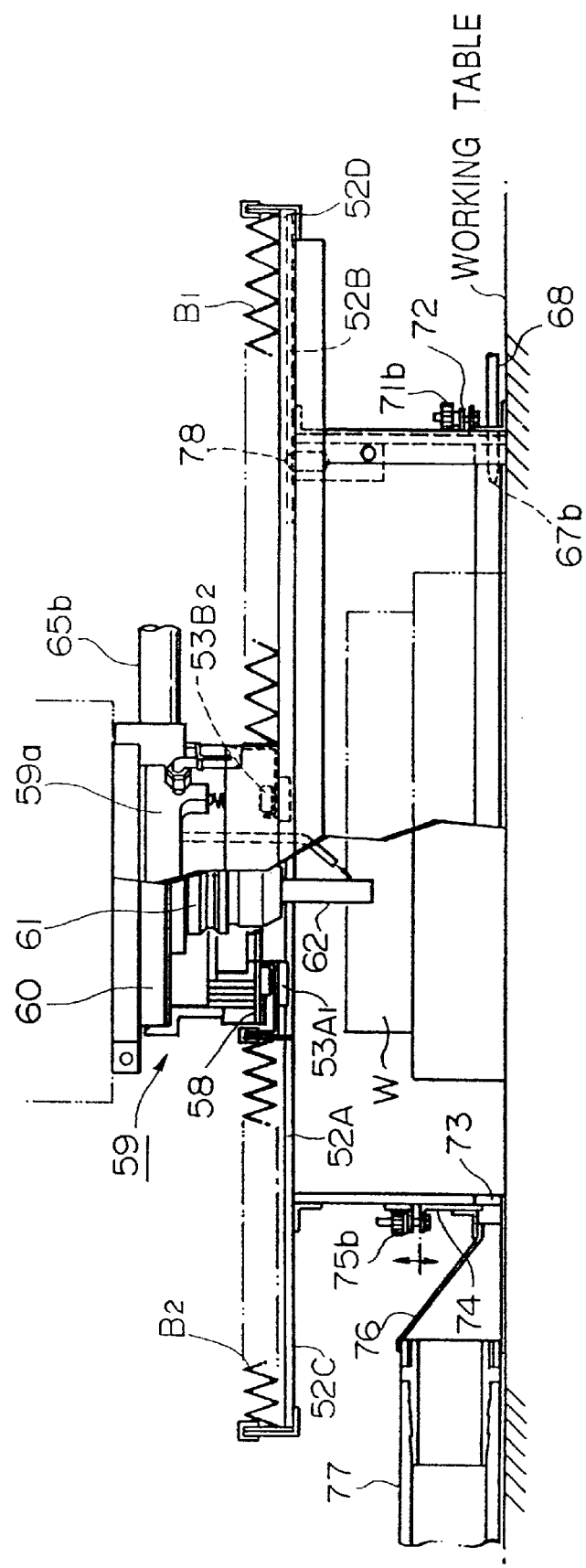
FIG. 10 is a view along line A—A of FIG. 9.

In this case 51, the work W is disposed and anchored, and in the upper part a pair of guide rail 52A or 52B is built along the X axis. As shown in FIG. 10, the said guide rails 52A and 52B are set slightly longer than the dimension of case 51 in the X axis, and are constructed so as to protrude from the case 51 on the right and left, respectively. On the guide rails 52A and 52B, at the lower end surface of the part protruding from the case 51, lower surface covers 52C and 52D of the bellow, respectively, are built.

In addition, on the above-described guide rails 52A and 52B, the rectangular moving table 54 provided with slide units 53A1, 53A2, 53B1, and 53B2 is mounted. Said moving table 54 moves in the X axis direction by each slide unit 53A1, 53A2, 53B1, and 53B2 sliding over the guide rails 52A and 52B.

Figure 9:
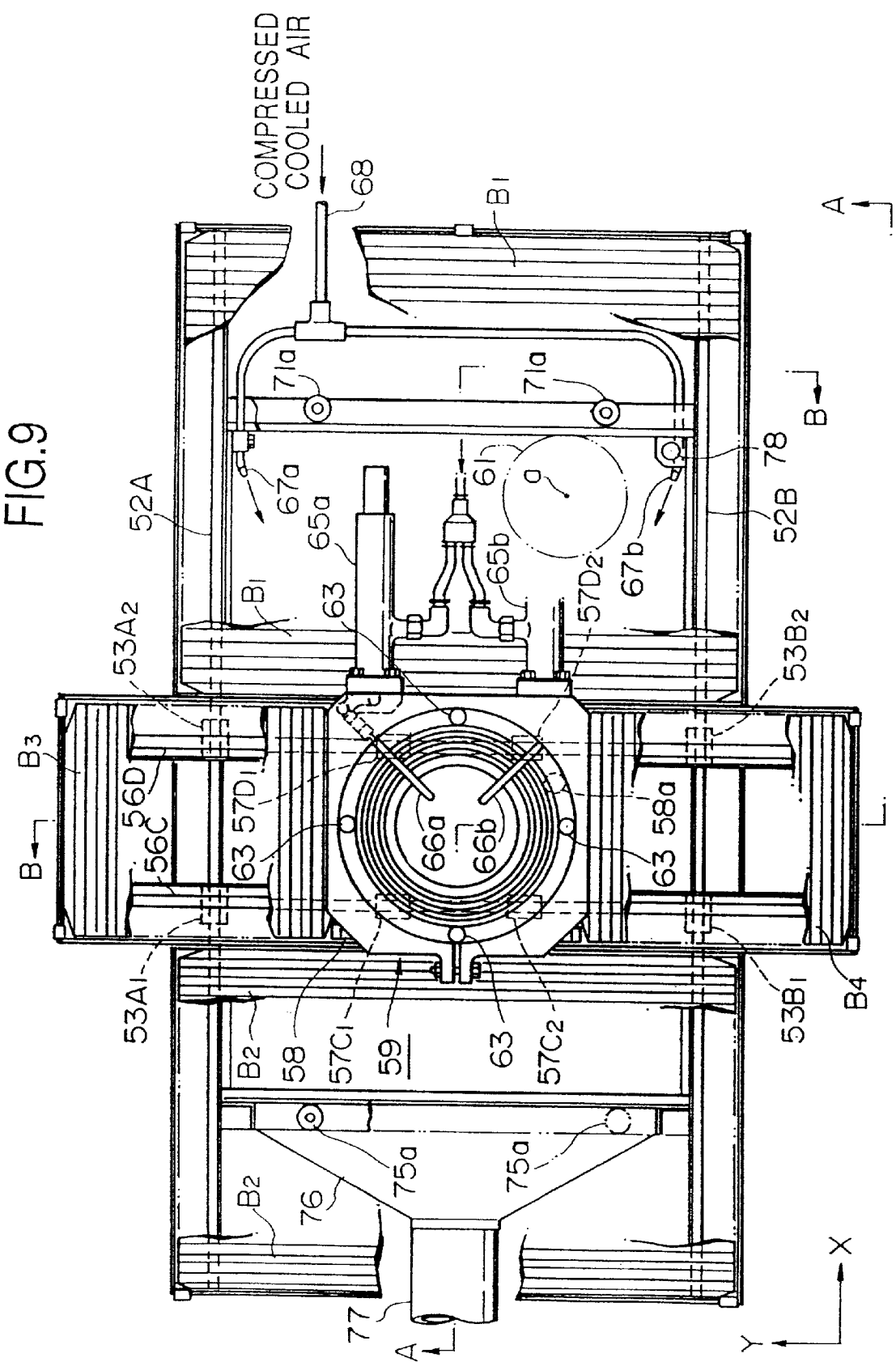
FIG. 9 is a front elevation showing the fourth embodiment of the machine tool of the present invention.

On this moving table 54, the pair of guide rails 56C and 56D is built with a predetermined gap opened in the Y axis direction. These guide rails 56C and 56D, as shown in FIG. 9, are set slightly longer than the dimension of case 51 in the Y axis direction, and are disposed so as to protrude in the horizontal direction from case 51. On these guide rails 56C and 56D, the bellow lower surface covers 56a and 56b, respectively, are built on the lower end surface of the part protruding from case 51.

On these guide rails 56C and 56D, slide units 57C1, 57C2, 57D1, and 57D2 are provided and the moving table 58 is mounted. By the slide units 57C1, 57C2, 57D1, and 57D2 sliding on the guide rails 56C and 56D, this moving table 58 moves in the Y axis direction. Moreover, the above-described guide rails 52A and 52B, the slide units 53A1, 53A2, 53B1, and 53B2 and the moving table 54, and the guide rails 56C and 56D, the slide units 57C1, 57C2, 57D1, and 57D2 and the moving table 58 constitute the movement means.

In this way, between the moving table 54 which moves in the X axis direction on case 51 and said case 51, bellows B1 and B2 which are the covering means are interposed, and between the moving table 58 which moves Y axis direction on moving table 54 and said moving table 54, the bellows B3 and B4 which are the covering means are respectively interposed. These bellows B1, B2, B3, and B4 are formed from an elastic material such as rubber.

That is, the above-described bellows B1 and B2 are disposed so as to cover the upper surface of case 51 between each end of guide rails 52A and 52B in such a way that they expand and contract freely in the X axis direction, and both end surfaces of moving table 54. For example, in FIG. 9, when the moving table 54 moves forward on the X axis (to the right), the bellow B1 folds and contracts, and the bellow B2 expands covering the upper surface of case 51. On the other hand, when the moving table 54 moves backwards on the X axis (to the left), the bellow B2 folds and contracts, and the bellow B1 expands covering the upper surface of case 51. Moreover, the bellows B1 and B2 are constructed so as to be quick-release connected to the moving table 54 and the case 51.

On the other hand, the bellows B3 and B4 are disposed so as to enclose the upper surface of the case 51 between each end of the guide rails 56C and 56D so as to expand independently a flexible material such as rubber in the y axis direction, and both surfaces of the moving table 58. For example, in FIG. 9, when the moving table 58 moves forward in the Y axis direction, the bellow B3 folds and collapses, and the bellow B4 expands covering the upper surface of the case 51. On the other hand, when the moving table 58 moves in the backward direction (the downward direction), the bellow B4 folds and contracts, and the bellow B3 expands to cover the upper surface of the case 51. The above mentioned bellows B1–B4, along with making possible the movement of the moving tables 54 and 58, also secure the enclosed condition of the upper open end of the case 51.

In addition, on the moving table 58, a cylindrical spindle cover 59 (the connecting means) is constructed, and the cylindrical spindle head 60 is installed by said spindle cover 59. In the spindle head 60, the spindle 61 is anchored in the central part, and at the end part of said spindle 61, the cutter 62 is installed. This spindle 61 is made to move vertically by a driving apparatus not shown in the figure. The spindle head 60, the spindle 61, and the cutter 62 constitute the processing means.

Figure 13:
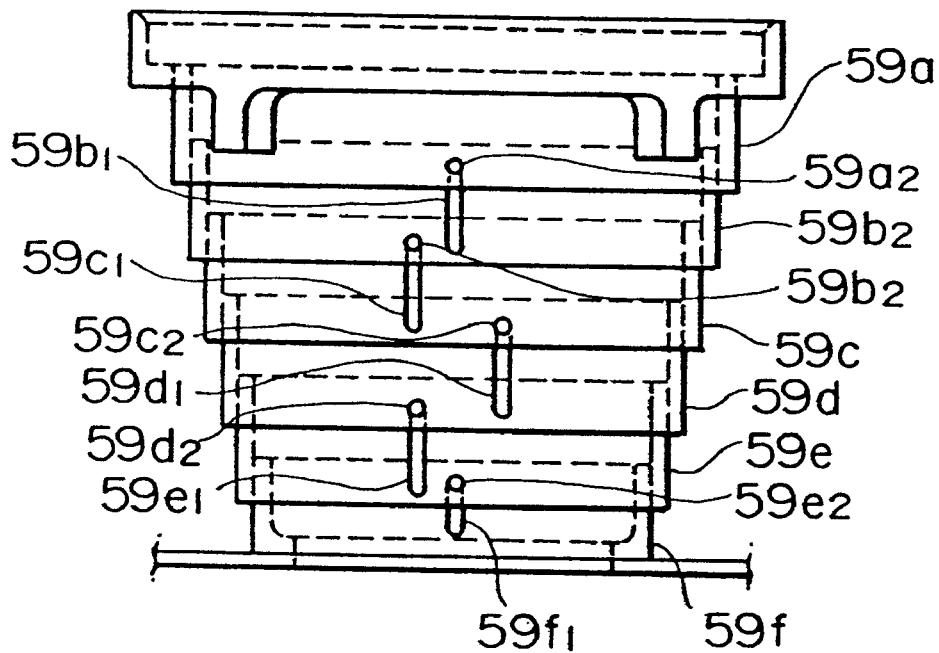
FIG. 13 is a frontal elevation showing a detailed construction of the spindle cover in the fourth embodiment of the machine tool of the present invention.
Figure 14:
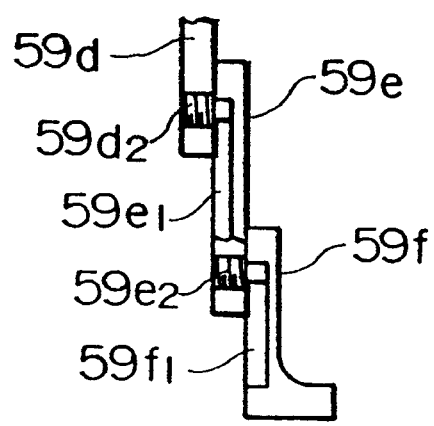
FIG. 14 is an enlargement of part of FIG. 13.

Moreover, in the above-mentioned moving table 54, the long narrow strip part positioned between the guide rails 56C and 56D forms a cavity, and when the spindle head 60 is installed in the spindle cover 59, the cutter 62 comes opposite to the work W As shown in FIG. 13 and FIG. 14, the above-mentioned spindle cover 59 is constructed from a multiply layered plurality of concentric rings 59a–59f and slides a predetermined distance in the direction of the central axis. Among the rings 59a–59f, on rings 59b–59f elliptical grooves 59b1–59f1 are each formed in a vertical direction on four places opened along the external edge. In these grooves 59b1–59f1, the guide pins 59a2 59e2, constructed on their adjacent rings 59a–59e, are engaged.

For example, as shown in FIG. 14, the groove 59f1 is formed on the ring 59f, and in said groove 59f1 the guide pin 59e2, anchored to the adjacent ring 59e, is engaged, and on groove 59f1 formed on ring 59e, the guide pin 59e2, anchored to adjacent ring 59d, is engaged. By constructing the spindle head cover 59 in this way, because some of the rings 59a–59f overlap and spread vertically, the cutter 62 can be moved vertically while kept enclosed in the case 51.

Figure 12:
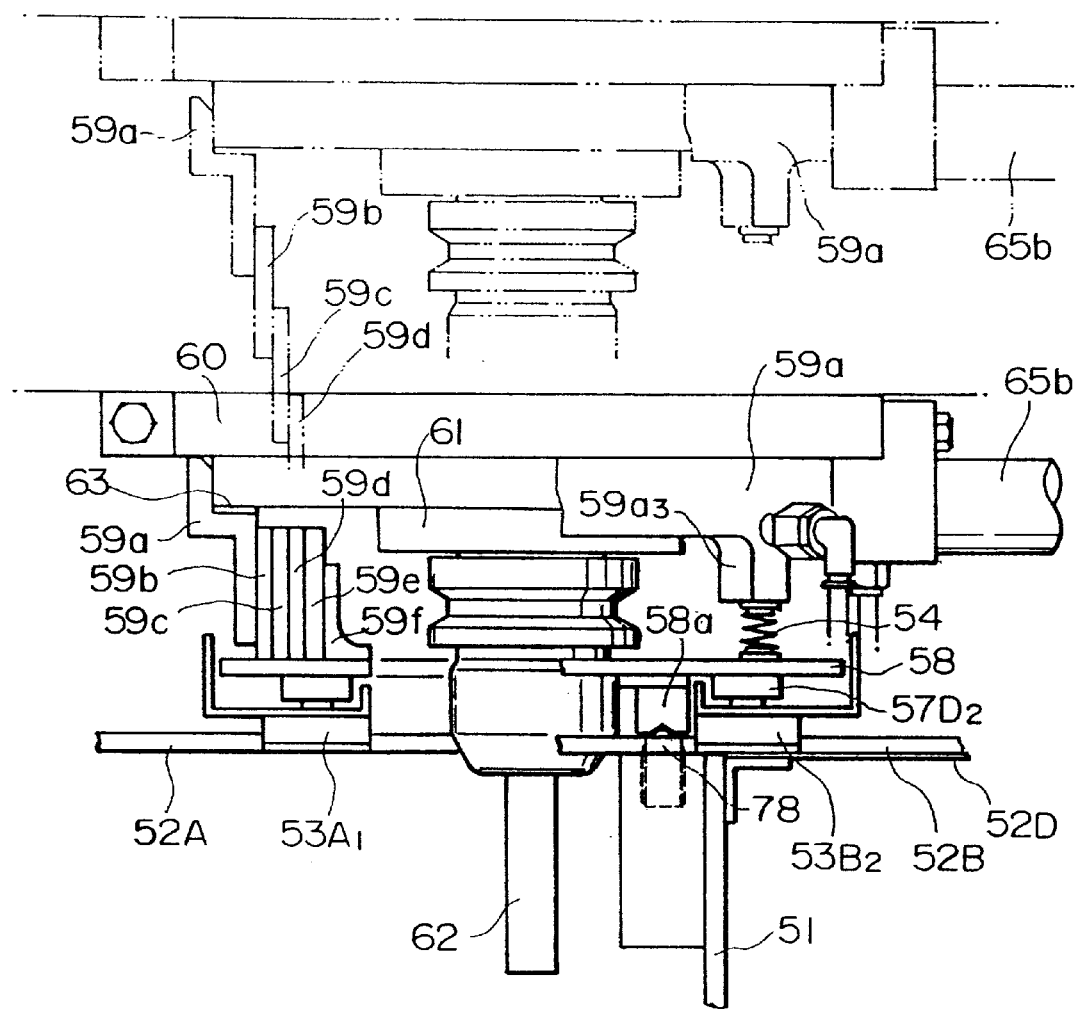
FIG. 12 is a diagram showing the relation between the moving table and the spindle head in the fourth embodiment of the machine tool of the present invention.

On the other hand, as shown in FIG. 12, on the fitting surface of the spindle head 60 in the above-mentioned ring 59a, a magnet made from a permanent magnet 63 is attached, and the spindle head 60 adheres to ring 59a by the magnetic force of said magnet 63. Also, on the perimeter of said ring 59a, the convex part 59a3 protruding downward is formed at regular intervals at four places, and between said convex part 59a3 and the moving table 58 compression springs 64 are respectively placed.

Also, on ring 59a, connecting cooled air nozzles 66a and 66b are anchored to the pair of air coolers 65a and 65b, respectively. Said cooled air nozzles 66a and 66b blow the cooled air supplied by the air coolers 65a and 65b on the cutter 62, and because they are formed by malleable metals such as copper or aluminum, the direction of blowing the cooled air can be adjusted.

Air coolers 65a and 65b cool the dry compressed air sent from a dry compressed air supply source not shown in the figure, and send it to the cooled air nozzles 66a and 66b. These air coolers 65a and 65b and the cooled air nozzles 66a and 66b form the cooling means which cools the cutter 62.

Also, as shown in FIG. 9, inside the above-mentioned case 51, in the vicinity of the corner on the right side, a pair of air blowing nozzles 67a and 67b which blow compressed air are disposed. At said air blowing nozzles 67a and 67b, compressed air is supplied via a conduit 68 from a compressed air supply source not shown in the figure. These air blowing nozzles 67a and 67b are opposite to the collection opening constructed such that the direction of the blowing of the compressed air is opposite to the air blowing nozzles 67a and 67b.

Figure 11:
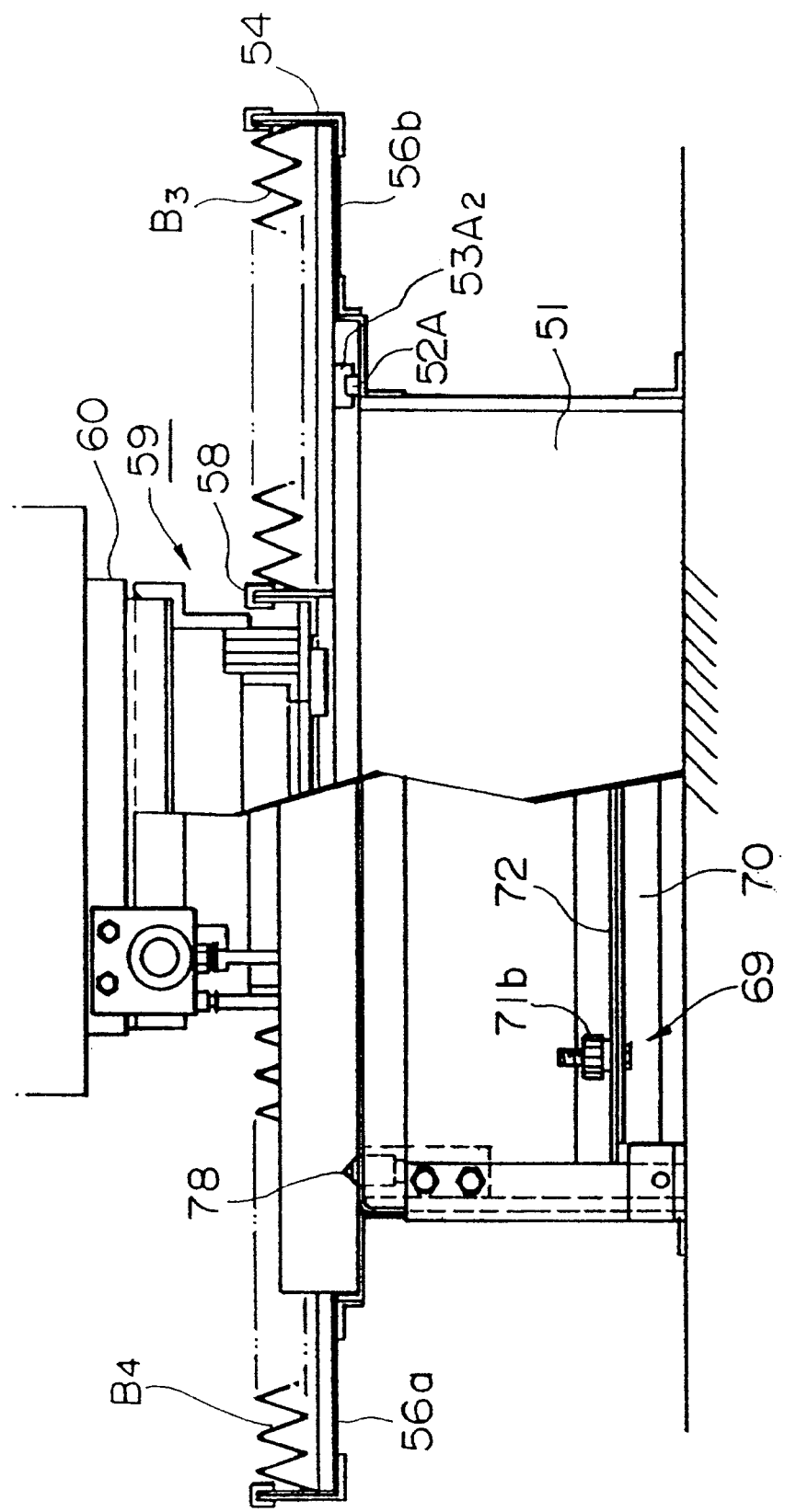
FIG. 11 is a view along line B—B of FIG. 9.

Moreover, as shown in FIG. 11, in the case 51, on the lower end of the surface on which the above-mentioned air blowing nozzles 67a and 67b are disposed, a external air intake opening 69 is constructed. On the upper part of this external air intake opening 69, an L-shaped folded slide plate 70 is screwed down onto an air volume adjustment angle steel 72 protruding from the case 51 by the pair of adjusting knobs 71a and 71b. That is, by manipulating the adjusting knobs 71a and 71b, the slide plate 70 moves vertically, and the surface area of the external air intake opening can be adjusted. The above-mentioned external air intake opening 69, slide plate 70, adjusting knobs 71a and 71b, and the air volume adjustment angle steel 72 constitute the external air intake means.

In the case 51, on the surface opposite to the external air intake opening 69, a collection opening 73 is constructed similarly to said external air intake opening 69. That is, on the upper part of the rectangular collection opening 73 which is constructed on the lower end part of the case 51, the L-shaped folded slide plate 74 is screwed onto the case 51 by the pair of adjusting knobs 75a and 75b, and by manipulating the adjusting knobs 75a and 75b, slide plate 74 moves vertically, and the surface area of the collection opening 73 can be adjusted.

Also, in the above-mentioned case 51, slide plate 74 is inserted, and hood 76 connecting to the collection opening 73 is constructed. This hood 76 communicates with the collecting duct 77 which is joined to a collecting apparatus not shown in the diagram. The above-described collection opening 73, slide plate 74, adjusting knob 75a and 75b, and the hood 76 and the collecting duct 77 constitute the collection means.

In addition, on the corner of the case 51, the bowl plunger 78 is provided along with bowl button 58a which protrudes downward on the above-mentioned moving table 58. That is, the bowl plunger 78 of the case 51 engages with the bowl button 58a of the moving table 58 thereby setting positioning the moving table as shown in FIG. 9 in the standard position a.

Next, the machining procedure will be explained using the above-mentioned machine tool.

First, by releasing the moving apparatus or by hand-operation, the moving table 58 is positioned in the standard position a, the fastener between bellow B2 and the moving table 54 is released, and the upper surface of case 51 placed in the open condition. In this condition, the work W is disposed and anchored inside the case 51, and by the machine table being activated by the drive means, the moving table 58 is moved, and the spindle cover 59 is disposed directly under the spindle 61. Here, the spindle 61 is lowered by actuating the moving apparatus, and the spindle head 60 is installed into the spindle cover 59 by the attraction force of the magnet 63.

Next, the bellow B2 and the moving table 54 are connected and the upper surface of case 51 is closed. At this time, the adjusting knobs 71a and 71b are manipulated opening the external air intake opening 69 to a predetermined width, and external air is brought into the case 51. At the same time, compressed air is blown towards the work W from the air blowing nozzles 67a and 67b. Also, the collecting apparatus joined to the collection duct 77 is actuated, and the air in the case 51 is collected in the case 51 by the collection opening 73 and the hood 76.

In this condition, by actuating the moving apparatus, the spindle 61 moves independently vertically in the X axis direction and the Y axis direction, and the work W is processed. At this time, because the spindle 61 is attached to the moving table 58 by the spindle cover 59, the moving table 58 and the moving table 54 move over the guide rails 52A, 52B, 56C, and 56D according to the movement of spindle 61. And following the movement of moving table 58 and moving table 54, by the expansion and contraction of the bellows B1–B4, the upper surface of the case 51 is kept in a closed position.

Also, along with the movement of spindle 61, the work W is processed by the cutter 62. At this time, cooled air is blown onto the cutter 62 from the cooled air nozzles 66a and 66b, and the heat generation on the cutter 62 is suppressed. At the same time, the particulate scraps produced by the processing are blown away from the processed part of work W and scattered within the case 51. The particulate scraps scattered inside the case 51 are moved in the direction of collecting opening 73 by the compressed air blown from the above-mentioned air blowing nozzles 67a and 67b, and then are collected in the collection opening 73 by the flow of air expelled from the collection opening 73 by means of the collection apparatus.

And the particulate scraps collected in the collection opening 73 are expelled outside the case 51 via the hood 76 and the collecting duct 77. Moreover, because the area of collection opening 73 can be changed by manipulating the adjusting knobs 75a and 75b, the amount and velocity of the air (including the particulate scraps) passing through the collection opening 73 can be adjusted by the adjusting knobs 75a and 75b. That is, the collection capacity of the particulate scraps can be adjusted by the adjusting knobs 75a and 75b.

Thus, according to the present embodiment, because the particulate scraps, after being blown up once by the cooled air nozzles 66a and 66b, are gathered in collection opening 73 by the compressed air blown from air blowing nozzles 67a and 67b, the amount of time they spend within the case 51 is reduced, and they are effectively collected and recovered.

Incidentally, as described above, the cutter 62 moves in three dimensions with A respect to the work W by the machine table moving in the X axis and Y axis directions and the spindle 61 moving vertically, processing the work W. But there are cases when it is necessary to replace the cutter 62 during processing. In this case, spindle 61 is moved to the standard position a, and by engaging. the bowl plunger 78 with the bowl button 58a, the moving table 54 and the moving table 58 are anchored, and then the spindle 61 is raised.

At this time, the ring 59a of the spindle cover 59 is joined to the spindle head 60 by the magnet 63, so it spreads and is raised up along with the movement of spindle 61, and balancing with the magnetic force of the magnet 63, is released from the spindle head 60 when the spindle 61 is raised up to a certain height. As a result, each ring 59a–59f of the spindle cover 59 is closed and returns to the collapsed condition.

The spindle 61 (more exactly, the spindle head 60), separated from the spindle cover 59, is moved to a predetermined position, and the cutter 62 is automatically replaced with a cutter replacement means not shown in the figure. It is repositioned up to the standard position a, and by lowering, it is installed in the spindle cover 59. Subsequently, as described above, the work W will be processed with a new cutter.

The following effects are achieved with the present embodiment of this kind of machine tool:

a. By the expansion and contraction of bellows B1–B4, each moving table 54 and 58 moves horizontally with respect to the case 51. In this case, each bellow B1 and B2 telescopes only in the X axis direction horizontally over the guide rails 52A and 52B, and the bellows B3 and B4 telescope only in the Y axis direction horizontally over the guide rails 56C and 56D.

That is, because the bellows B1–B4, in either an expanded state or a contracted state, telescope along the guide rails 52A and 52B or the guide rails 56C and 56D in a state in which orthogonal gravity with respect to the direction of telescoping is acting in equilibrium, the bellows B1–B4 steadily telescope with respect to the movement of the moving tables 54 and 58. Therefore, because the bellows B1–B4 telescope very responsively with respect to the movement of the moving tables 54 and 58, the work W can be processed under good operational conditions.

b. The cutter 62 can be moved in comparatively broad strokes while enclosed within the case 51. Therefore, in comparison with the conventional technology, by an extremely simple construction, the particulate scraps produced by processing do not scatter outside of the case 51, and not only flat work W but solid work W can be easily processed.

c. The external air brought into the case 51 from the external air intake means is expelled by the collection means along with the particulate scraps produced by processing. Therefore, the particulate scraps are effectively collected and expelled. Also, when air blowing nozzles 67a and 67b which blow compressed air in the direction of the collection means are provided, the particulate scraps scattered to the area around the work W are then effectively collected and recovered by the collection means.

d. Because the spindle covers 59 are formed from a plurality of rings 59a–59f which are concentrically layered and slide within the breadth dimension in the direction of the central axis, the cutter 62 can be moved in a comparative broad stroke while the closed condition of the case 51 is maintained.

e. Because the cutter 62 is installed in spindle covers 59 using magnetic force, the construction is extremely simple, and the cutter's 62 attachment to and release from the moving means is extremely easy.

f. Because the cooled air nozzles 66a and 66b which blow cooled compressed air onto the cutter 62 are provided, the cutter is effectively cooled, and the particulate scraps produced by the cutter 62 are scattered from the part being processed.

g. Because the cooled air nozzles 66a and 66b are formed so that the direction of blowing cooled compressed air on the cutter 62 can be changed, the direction of blowing of the cooled compressed air can be set according to the length, etc., of the cutter 62. As a result, cooling of the cutter 62 and the expelling of particulate scraps from the part being processed is effectively performed.

h. Because the external air intake means is formed so that the amount of air brought in can be changed, and because the collection means is made so that the amount of expelled air in the case 51 can be changed, the particulate scraps collection capacity can be easily adjusted.

Moreover, this present invention is not limited to the forms of the above-mentioned embodiments, and modifications of the following type are included within the range of the present invention:

a. In the above-mentioned embodiment, a machine tool of the type which processed the work W from above is described, but the present invention is not limited to this, and can be applied to a machine tool of a type which processes the work from the side of at an angle.

For example, in a machine tool which processed the work W from the side, the side surface of the square case is made the open surface, a guide rail is constructed on said open surface, and further a moving table that moves freely along the guide rails is constructed, and a spindle furnished with a cutter is installed on said moving table. And, by moving the spindle within a perpendicular plane along the open surface with respect to the work, processing is carried out. However, in this case, because the moving table moves on a perpendicular plane, it is necessary to form the slide unit in such a way that the moving table does not quick-release from the guide rail.

b. In the above-mentioned embodiment, a permanent magnet was used as the magnet 63, but an electric magnet can be used in place of said permanent magnets. And by turning the current for said electric magnets on and off, the quick-release of the spindle cover and the spindle head can be controlled. By this means, the quick-release of the spindle head can be arbitrarily controlled by the electric current to the electric magnet.

c. In the above-mentioned embodiment, the connection between the spindle cover 59 and the spindle head 60 was made by the magnetic force of the magnet 63, but in place of said magnet 63, on the part of ring 59a that overlaps the side surface of spindle head 60, where the spindle head 60 is continuous with the ring 59a, one can consider forming holes of a predetermined depth, and by a pin in said holes protruding from the horizontal surface, a means which maintains the connected state of the spindle cover 59 and the spindle head 60.

In this case, the above-mentioned holes are formed in plurality on the outer perimeter of the rings 59a and the spindle head 60, and the spindle cover 59 and the spindle head 60 are stabilized and connected. For example, we can consider the realization of the insertion of the above-mentioned pin by constructing a cylinder in which the shaft moves horizontally to the spindle head 60, and by actuating said cylinder, the end of the shaft is inserted into the above-mentioned holes.

d. In the above-mentioned embodiments, by the spindle 61 being raised, said spindle 61 is constructed such that it quick-releases completely form the moving table 58, but one can consider constructing a plurality of cylinders in which shafts along the perimeter of spindle head 60 telescope vertically, and the end of each shaft is anchored in the ring 59a. In this case, by actuating the cylinder and telescoping the shafts, the spindle head 60 and the spindle cover 59 become detached, and by enclosing the shafts, the spindle head 60 and the spindle cover 59 are joined.

By using this kind of construction, because the spindle head 60 and the spindle cover 59 are separated and joined in a state in which the positional relation in the horizontal direction is maintained, compared to the construction of the above-mentioned embodiment in which the above-mentioned spindle 61 is completely detached from the moving table 58, the installation of spindle cover 59 and spindle head 60 is extremely easy.

e. As an enclosing means, in place of the above-mentioned bellow, one can consider using a flat sheet formed from a stretchable elastic material such as rubber. By the expansion and contraction of said sheet, the moving table can be moved while maintaining the closed condition of the upper opening of the case.

f. In the construction of the spindle cover, the connection of each ring is not limited to the above-mentioned construction, but other constructions are possible if the breadth of the movement in the vertical direction and the movement on the perimeter can be regulated.

Figure 15:
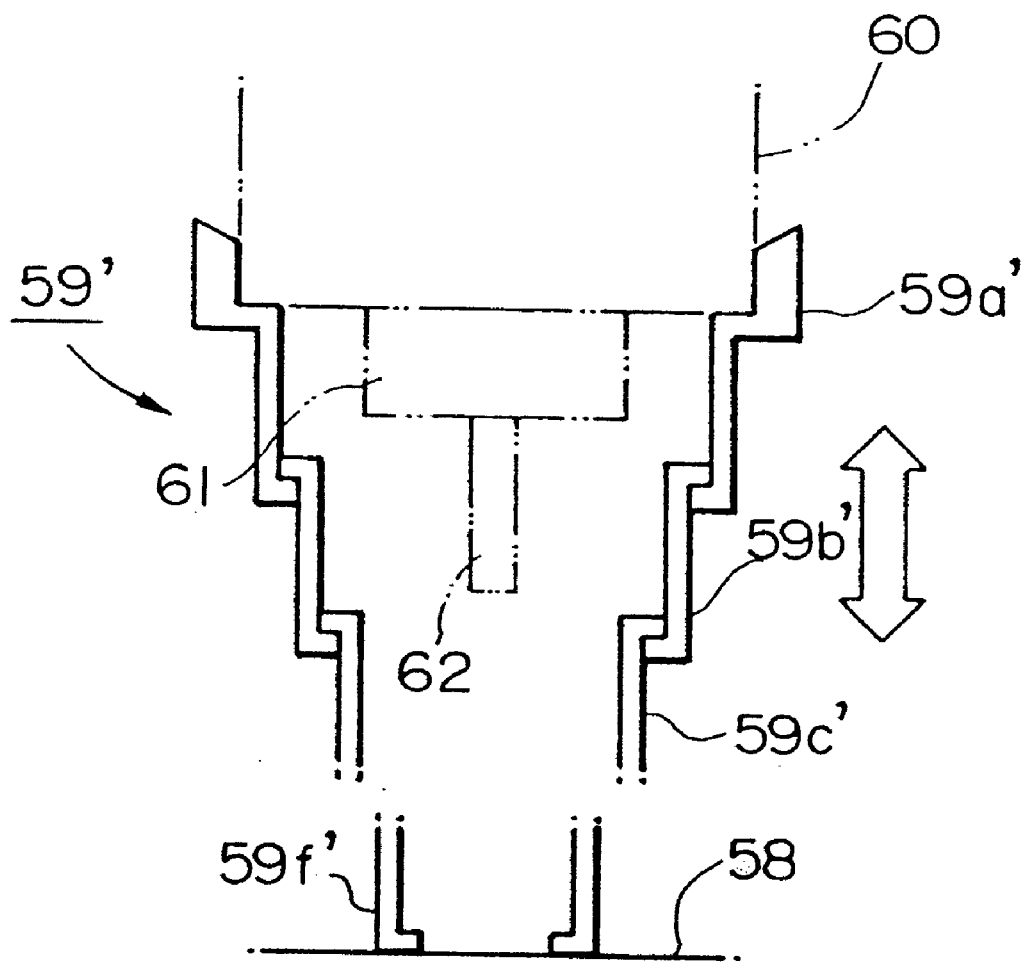
FIG. 15 is a planar view showing another example of construction of the spindle cover in the fourth embodiment of the machine tool of the present invention.

For example, as shown in FIG. 15, with both ends of each ring 59*a'*–59*f* of the spindle cover 59' being formed in an L-shape and the ends of each of said rings 59*a'*–59*f* being in contact, a construction in which the vertical slide breadth is regulated can be considered. By using such a construction, because the structure of the spindle cover 59' becomes extremely simple, durability can be increased and the cost of machine tool can be reduced.

g. In the above-mentioned embodiments, each ring 59*a*–59*e* which forms the spindle cover 59 is formed as a cylinder, but in place of a cylinder, one can consider applying square or polygon rings.

h. The above-mentioned embodiments are constructed so that by the machine table moving in a horizontal direction, the relative position of the work with respect to the cutter is moved and said work is processed, but it can be constructed so that the relative positions of the cutter and the work can be changed using the moving apparatus by moving the spindle in three dimensions. In this case, although the construction of the moving apparatus becomes complicated, because it becomes unnecessary to construct a driving apparatus on the machine table, the cost of the machine tool can be reduced.

i. In the above-mentioned embodiments, the fastener between the bellow B2 and the moving table 54 is released, the upper surface of the case 51 is opened, and the work W is positioned and anchored inside the case 51, but an opening can be made on the side of case 51, and the work W inserted and positioned within the case 51. For example, in the case 51, an opening is constructed on a surface other than that on which the external air intake means or the collection means are built.

j. In the above-mentioned embodiment, two air blowing nozzles 67*a* and 67*b* are constructed, but the present invention is not limited to this. Depending on conditions of the expelling of the particulate scraps, the number and position of air blowing nozzles suitably dispositioned can be changed.

What is claimed is:

1. A machine tool comprising:
  an enclosing means constructed on a working table having an open upper surface, and enclosing a processed object;
  a processing means for processing the processed object;
  a moving means on which said processing means is installed disposed over said enclosing means, the moving means moves over the open upper surface of the enclosing means following a change of relative position between the processing means and the working table in a horizontal plane;
  a connecting means which is interposed between the processing means and the moving means, the connecting means expanding and contracting in a vertical direction according to a vertical motion of the processing means;
  a covering means which is disposed between the enclosing means and the moving means so as to cover the upper open end of the enclosing means, the covering means expands and contracts to follow motion of the moving means; and
  wherein the moving means comprises a first moving table that moves on first guide rails and a second moving table that moves on second guide rails, said second guide rails being disposed perpendicular to said first guide rails.

2. A machine tool according to claim 1, wherein the covering means is a bellows.

3. A machine tool according to claim 1, wherein the covering means is a sheet made of an elastic material.

4. A machine tool according to claim 1, wherein the covering means is a plurality of plate members that are disposed in layers and slide over one another.

5. A machine tool according to claim 1, wherein the connecting means is a plurality of rings that are disposed in concentric layers and slide toward a center axis.

6. A machine tool according to claim 1, wherein the processing means is installed in the connecting means by magnetic force.

7. A machine tool according to claim 1, further comprising a cooling means for blowing compressed air to cool a cutter forming the processing means.

8. A machine tool according to claim 7, wherein the cooling means is an air nozzle that is freely bent.

9. A machine tool according to claim 1, wherein the enclosing means comprises a collection means for collecting scraps in the enclosing means.

10. A machine tool according to claim 9, wherein the enclosing means comprises an external air intake means positioned at a side opposite to the collection means for taking in the external air into the enclosing means.

11. A machine tool according to claim 9, further comprising an air blowing nozzle for blowing compressed air in the direction of the collecting means.

12. A machine tool according to claim 10, further comprising an air blowing nozzle for blowing compressed air in the direction of the collecting means.

13. A machine tool according to claim 10, wherein the external air intake means comprises an external air adjustment means for adjusting a volume of external air taken into the enclosing means.

14. A machine tool according to claim 10, wherein the collection means comprises a collecting scraps adjustment means for adjusting a volume of collecting scraps.

15. A machine tool according to claim 11, wherein the collection means comprises a collecting scraps adjustment means for adjusting a volume of collecting scraps.

16. A machine tool according to claim 13, wherein the external air adjustment means adjusts the volume of external air taken into the enclosing means by adjusting an opening area of an external air intake opening provided on the enclosing means.

17. A machine tool according to claim 14, wherein the collecting scraps adjustment means adjusts the volume of collecting scraps by adjusting an opening area of a collection opening provided on the enclosing means.

18. A machine tool according to claim 15, wherein the collecting scraps adjustment means adjusts the volume of collecting scraps by adjusting an opening area of a collection opening provided on the enclosing means.

\* \* \* \* \*